United States Patent [19]

Tōnoki et al.

[11] 4,035,447
[45] July 12, 1977

[54] FIRE RESISTANT POLYMER COMPOSITION

[75] Inventors: Satoshi Tōnoki, Kobe; Yoshio Iki, Osaka; Takashi Sakauchi, Kobe, all of Japan

[73] Assignee: Kanegafuchi Kagaku Kogyo Kabushiki Kaisha, Osaka, Japan

[21] Appl. No.: 609,481

[22] Filed: Sept. 2, 1975

[30] Foreign Application Priority Data

Sept. 13, 1974 Japan .............................. 49-106311
Jan. 28, 1975 Japan .............................. 50-12254
July 24, 1975 Japan .............................. 50-90822

[51] Int. Cl.² .......................................... C08L 27/00
[52] U.S. Cl. .......................... 260/890; 260/45.75 P; 260/45.75 M; 260/45.75 N; 260/45.75 D; 260/45.75 J; 260/45.75 S; 260/45.75 T; 260/893

[58] Field of Search .... 260/891, 892, 890, 45.75 P, 260/45.75 M, 45.75 N, 45.75 D, 45.75 J, 45.75 T, 45.75 SS, 85.5 R, 85.5 XA, 80.77, 80.8; 521/293

[56] References Cited

U.S. PATENT DOCUMENTS 2,807,603  9/1957  Parks et al. ...................... 260/891
3,658,947  4/1972  Ito et al. .......................... 260/891

Primary Examiner—J. Ziegler
Attorney, Agent, or Firm—Moonray Kojima

[57] ABSTRACT

A fire resistant polymer composition comprising 99.9 to 50 parts by weight of a copolymer consisting essentially of 90 to 10 weight percent nuclear-halogenated aromatic vinyl compound, 10 to 90 weight percent cyanized vinyl compound, and 0 to 30 weight percent one or more monomers copolymerizable therewith; 0 to 20 parts by weight rubber-like polymer; and 0.1 to 30 parts by weight of a member selected from the group consisting of iron family compounds, tin compounds, and mixtures thereof.

11 Claims, No Drawings

FIRE RESISTANT POLYMER COMPOSITION

BACKGROUND OF THE INVENTION

This invention relates to a novel polymer composition having excellent fire resistance, good mechanical and thermal properties and which does not present any hazard to the environment or health.

Recently, demand for fire resistant polymeric materials has increased and laws and regulations regarding fire resistant materials have become more stringent.

Commonly used polymeric materials are easily combustible. There is a prior method which attempts to make these polymeric materials fire resistant by adding a large amount of fireretarding additives, such as halogen containing compound, phosphorous compound, or antimony compound to the polymeric material. However, this conventional method has certain deficiencies, such as the resulting product exhibits certain poor properties and poor thermal stability due to the addition of the large amounts of additive. Also, the problems of hazard to environment and health arise from the process used to manufacture such additives. Moreover, problems arise during the process of adding the additive to the polymeric material, as well as in the usage of the final article or product.

For the purpose of obtaining fire resistant polymeric materials free from the above difficulties, the following conditions should be satisfied. (1) The polymeric material itself must have a favorable structure for imparting fire resistance. (2) The fire retarding additive must be non-poisonous or be low in poison. (3) The required amount of fire retarding agent must be small in amount. (4) The additive must be thermally stable and should not decompose during the molding process, and (5) other conditions if any.

SUMMARY OF THE INVENTION

The present inventors have discovered a novel composition comprising a copolymer comprising nuclear-halogenated aromatic vinyl compound and cyanized viny compound as main components, and iron family compound and/or tin compound, which composition advantageously has excellent mechanical and thermal properties, good processability, does not present hazard to environment or health and is fire resistant.

Briefly, the invention encompasses a composition comprising
1. 99.9 to 50 weight parts of a copolymer consisting essentially of nuclear-halogenated aromatic vinyl compound and cyanized vinyl compound as main components;
2. 0 to 20 weight parts of a rubber like polymer; and
3. 0.1 to 30 weight parts of one or more members selected from the group consisting of (A) iron family compounds, (B) tin compound, and (C) mixtures of the foregoing. The weight parts can be in terms of weight percent where the total parts are 100.

The following detailed description further illustrates this invention. The parts and percentages are in terms of weight unless otherwise specified.

DETAILED DESCRIPTION OF PREFERRED EMBODIMENTS

Since nuclear halogenated aromatic vinyl polymer, such as polymonochlorostyrene, has a halogen atom, such polymer is less combustible than common polymeric materials. However, such polymer alone is not sufficiently fire resistant for practical use due to its low halogen content and the difficulty of eliminating the nuclear substituted halogen atom.

Cyanized vinyl polymer, such as polyacrylonitrile, has a strong carbonizing tendency when subjected to fire; in other words, the polymer leaves a large amount of burning residue after burning. Thus, the polymer is relatively less combustible than other common polymers. However, its fire resistance is still unsatisfactory for practical use by itself. Furthermore, when one or more of the metal compounds set forth above as items (3)(A) and (3)(B), namely, the iron family compounds and tin compounds, are added to a polymer of nuclear-halogenated aromatic vinyl compound used alone or the cyanized vinyl compound used alone, or a mixture of the polymers, the increase in fire resistance is still unsatisfactorily small.

The present inventors have discovered that by adding one or more iron family compound and/or tin compound to a copolymer consisting essentially of nuclear halogenated aromatic vinyl compound and cyanized vinyl compound as main components, there is produced a composition which, unexpectedly, results in the product being more effective in fire resistance, in both the gaseous and solid phases. It appears that the halogen atoms are effectively separated from the product and the product is rapidly carbonized when exposed to fire. The above phenomena is theoretically unexplained. However, it is believed that to obtain the characteristic fire resistance, the ratio of sequence between nuclear halogenated aromatic vinyl compound and cyanized vinyl compound units should be high.

According to the present invention, one component of the copolymer (1) recited above is a nuclear halogenated aromatic vinyl compound, such as mono-, di-, tri-halogenated styrene, for example, o-, m- and p-chlorostyrene, o-, m- and p-bromostyrene, o-, m-, and p-fluoro styrene, dichlorostyrene, trichlorostyrene, tribromostyrene and monochloro-monobromostyrene; monochlorovinyltoluene, monochlorovinyl naphthalene; and the like. From an industrial standpoint, monochlorostyrene is preferred. The amount used can be selected within a wide range depending on the purpose. However, taking into consideration the resistivity to be obtained, mechanical and processing properties, and other properties, it is preferred to use 90 to 10% and more preferably 80 to 50% based on the weight of the copolymer.

Another component of the copolymer (1) is cyanized vinyl compound, such as acrylonitrile, methacrylonitrile, ethacrylonitrile, alpha chloroacrylonitrile, and the like. Acrylonitrile is preferred from an industrial standpoint. The amount used may be the amount remaining in the copolyemr above the amount of nuclear halogenated aromatic vinyl compound. Thus, the amount of cyanized vinyl compound is preferably 10 to 90% and more preferably 20 to 50%, based on the weight of the copolymer.

Copolymer (1) may also contain other polymerizable comonomers, depending upon the purpose and requirements of the composition. For example, suitable monomers may be selected depending upon the purpose of improving copolymerizability, heat stability and fluidity during molding process, enhancing fire resistance, improving pliability and imparting other desired properties to the composition.

Monomers which may be used to copolymerize with the nuclear halogenated aromatic vinyl compound and cyanized vinyl compound, are aromatic vinyl compounds, such as styrene, alpha methal styrene, vinyl toluene and the like; alpha, beta-unsaturated carbonic acids, their esters and their amides, such as acrylic acid, methacrylic acid, methyl acrylate, methyl methacrylate, t-butyl methacrylate, phenylmethacrylate, acrylamide, methacrylamide and the like; vinyl ester, such as vinyl acetate; phosphorous containing monomer, such as vinyl phosphonic acid and maleic anhydride and mixtures thereof.

Selection of type and amount of the above monomers may depend upon the desired extent of improvement in appropriate properties and the desired level of fire resistance. When such monomer is used in excessive amounts sufficient enhancing of fire resistance is difficult to obtain. Therefore, such copolymerizable monomer is preferably used in an amount of 0 to 30% by weight based on the amount of copolymer (1). It is recommended to use such copolymerizable monomer in as small amount as possible for improving the concerned property.

Thus, the copolymer (1) comprises at least 10% nuclear halogenated aromatic vinyl compound and at least 10% of cyanized vinyl compound, and less than 30% of one or more copolymerizable monomers.

The method of manufacturing copolymer (1) is not limited, and and any type of polymerization method may be used, for example, bulk polymerization, solution polymerization, suspension polymerization and emulsion polymerization. The most preferable method is radical emulsion polymerization. Conventional polymerization initiators, molecular weight regulators, emulsifiers, and other additives may be used. There is no limitation regarding the method of adding monomers and additives. However, a suitable method should be used to attain good copolymerizability, considering monomer reactivity of nuclear halogenated aromatic vinyl monomer and cyanized vinyl monomer.

The rubber like polymer (2) used in the present invention may be polymers having glass transition temperatures lower than room temperature; for example, diene polymers such as polybutadiene, polyisoprene, polychloroprene and the like; acrylic ester polymers, such as polybutyl methacrylate, poly-2-ethyl hexylacrylate and the like; olefinic polymers, such as ethylene-propylene copolymer, ethylene-vinyl acetate copolymer and the like; polypentenamer, epichlorohydride rubber, chlorinated polyethylene; and diene copolymers such as styrene-butadiene copolymer, acrylonitrile-butadiene copolymer and the like; and mixtures thereof. Among the polymers shown above, polybudienic polymers, such as polybutadiene, copolymer of styrene and butadiene, and copolymer of acrylonitrile and butadiene are preferred. By cooperating with such rubber-like polymer, the final product has good impact strength. Furthermore, when a rubber like polymer is used in an appropriate amount, the final product has enhanced fire resistance since upon heating due to fire, copolymer (1) is prevent from flowing out and the carbonized part easily holds its original shape.

However, when the rubber like polymer is used in an excess amount, decrease in rigidity and reduction of fire resistance results in the final product. Thus the amount of rubber like polymer to be used in the composition is preferably from 0 to 20% by weight. In order to reinforce vinyl copolymer (1), with rubber like polymer (2), the above two polymers may be subjected to compounding according to any known method. More preferably the polymer may be in an amount of 5 to 15 weight percent.

The compounding method used may be as follows: blending of copolymer (1) with rubber like polymer (2) in emulsion or in solution and then recovering solid polymer from the emulsion or solution; blending in melting state; graft copolymerizing copolymer (1) in the presence of rubber like polymer (2); and graft blending copolymer (1) with graft copolymer prepared by graft copolymerizing copolymer (1) in the presence of rubber like polymer (2), etc. Among the above methods, the grafting method and the grafting-blending method are preferred, considering the attained level of fire resistance and mechanical strength of the obtained product.

The iron familycompound (as hereinafter defined) used herein and set forth as (3)(A) above, may be inorganic and organic compound containing iron, cobalt or nickel; for example, oxides, such as iron oxide, cobalt oxide and nickel oxide; hydroxides, such as iron hydroxide, cobalt hydroxide and nickel hydroxide; organic acid salts such as iron salt of naphthenic acid, cobalt salt of stearic acid and the like, ferrocene metallothene of nickel and cobalt; metallic salts of carbonic acid; metallic salt of sulfuric acid and mixtures thereof. In consideration of economy, the attained level of fire resistance and other properties, ferric oxide is preferred and ferric oxide of fine grain form, especially of less than 0.2 micron in diameter as measured by electron microscope is particularly preferred.

Tin compounds used herein as compound (3)(B) recited above may be inorganic and organic compound containing tin, for example, tin oxide, meta-stannic acid, tin sulfate, tin oxalate, bis-triphenyl tin, and mixtures thereof. Considering fire resistance attained, and other properties, stannic oxide is preferred and stannic oxide of fine grain form, especially of less than 0.2 micron as measured by electron microscope is particularly preferred.

The amount of metal compound, such as (3)(A) and (3)(B) to be used depends upon the type and amount of vinyl copolymer (1) and rubber like polymer (2) and is not limited. However, when used in an excessive amount, the resulting composition has poor mechanical properties and other disadvantages. Therefore, the metal compound is preferably used in an amount of 0.1 to 50% in the composition and more preferably 1 to 10%, by weight. The specified metal compound (3)(A) and (3)(B) can be used singly or in mixture of two or more of either or both groups (3)(A) or (3)(B). For obtaining high fire resistance, the mixed use of at least one type of iron family compound (3)(A) with one or at least two types of tin compound (3)(B) is particularly preferred.

Each of the components mentioned above may be compounded using a known method to produce the composition of this invention. For example, each component may be mixed well with each other in powder or grain form, followed by mixing thoroughly with a kneading machine having sufficient plasticizing power.

Various additive may be added to the composition, such as lubricating agent, stabilizing agent, fire-retarding agent pigment, other types of commonly used additives, inorganic filler, composite-reinforcing agent such as glass fiber, small amounts of polymer additives such as polyolefine, etc., as needed or as desired.

Since the inventive composition obtained contains nuclear halogenated aromatic vinyl compound which is polymerized, and iron family compound and/or tin compound and no common fire retarding agent or very small amounts of common fire retarding agent, the composition is thermally stable, easily processible, presents no hazard to health or environment and has superior mechanical and thermal properties and has good fire resistance. The inventive composition is an extremely useful material from which can be fabricated various types of molded or other products at small expense.

The inventive composition has a variety of uses, such as for example, use to form an enclosure for electronic apparatus, such as television sets, internal parts, such as automobile parts, etc.

The selection of type of composition can be made preferably depending upon the required extent of fire resistance, thermal stability and mold stability of the final product.

The invention will now be described and further illustrated with actual examples and contrasting examples. These examples are not to be construed as limiting the scope of the invention.

Flammability and other properties were measured by the following method. Flammability of the composition was measured by the Limiting Oxygen Index (LOI) method according to standard ASTM-D2863 and the test method was according to Test No. 94 of the Underwriters Laboratories (UL-94). The LOI tests according to ASTM-D2863 were carried out on samples of 3 × 6.5 × 150 mm size, using a flammability test apparatus, Type ON-1 (manufactured by Suga Testing Machine Co, Ltd). The LOI value is the minimum oxygen volume percent, when mixed with nitrogen, just sufficient to ensure that the downward combustion of a given sample is maintained either for about 3 minutes or in about 50 mm of the sample length. The higher the LOI value, the better the fire resistance.

According to UL-94 flammability test, samples of 6 × ½ × ⅛ inch size were fixed vertically in direction with the long axis of the samples, and exposed downward, with the distance of ⅜ inch, to blue flame of ¾ inch in length from a Bunsen burner to ignite the samples. After 12 seconds ignition the samples are removed from the flame and the times required for the samples to be extinguished were measured.

Immediately after extinguishing the ignited sample, a flame is again applied to it for 10 seconds and the time required for the sample to be extinguished was measured. The same testing procedure was used for five samples. Flame resistance rank 94V–1 refers to the case when the maximum time required to extinguish does not exceed 30 seconds. The average time required to extinguish is less than 25 seconds and the flaming particles do not drip at all. 94–0 refers to the case when maximum time to extinguish does not exceed 10 seconds and the average time to extinguish is less than 5 seconds.

As to the measurement of impact strength, the notched Izod impact strength was measured on a sample of ¼ inch thickness according to ASTM-D256 method.

Regarding softening temperature, the Vicat softening temperature was measured using a load of 5 kg/cm$^2$ according to ASTM-D1525. EXAMPLES 1–15 and REFERENCE EXAMPLES 1 – 13.

Copolymers of various composition were produced by emulsion redox polymerization using mixed monochlorostyrene (o-chlorostyrene 65% and p-chlorostyrene 35%) and acrylonitrile.

To 250 parts of water, 3 parts of sodium oleate, 0.3 part of sodium formaldehyde sulfoxylate, 0.0025 part of ferrous sulfate 7 hydrate and 0.01 part of bisodium salt of ethylene-diamine tetraacetic acid bihyrate were added. The resulting mixture was heated to 60° C. To the mixture, 100 parts of monomer, 0.5 part cumenehydroperoxide and 0.2 part tert-lauryl mercaptan were added continuously in nitrogen atmosphere in a period of 6 hours. The product obtained was subjected to salting. To 100 parts of resin thus obtained, ferric oxide and/or stannic oxide in various amounts were added as shown in Table 1, then rolled and pressed at 160° C to prepare test samples. The same procedure was repeated for the reference examples, except no ferric oxide or stannic oxide was added. Further, the same procedure was repeated except using homopolymers of acrylonitrile and/or mixed chlorostyrene with or without ferric oxide and/or stannic oxide, as shown in Table 1. From these products, test samples were prepared. The LOI tests and values obtained for the various samples are shown in Table 1.

As seen from the Table 1, the LOI values increased remarkably when ferric oxide or stannic oxide was added to the copolymer of acrylonitrile and mixed chlorostyrne. Especially, the effect of the metal oxide compounding was considerable on the copolymer having equimolar composition of chlorostyrene and acrylonitrile (70% of chlorostyrene and 30% of acrylonitrile). Particularly, addition of both ferric oxide and stannic oxide to the resin has synergistic effect to increase the LOI value.

TABLE 1

| Example No. | Composition of copolymer | | Ferric Oxide (part) | Stannic Oxide (part) | LOI (%) |
| --- | --- | --- | --- | --- | --- |
| | mixed chlorostyrene (part) | acrylonitrile (part) | | | |
| 1 | 77 | 23 | 5 | | 24.9 |
| 2 | 69 | 31 | 5 | | 25.6 |
| 3 | 60 | 40 | 5 | | 25.2 |
| 4 | 48 | 52 | 5 | | 24.8 |
| 5 | 22 | 78 | 5 | | 22.3 |
| 6 | 77 | 23 | | 5 | 24.0 |
| 7 | 69 | 31 | | 5 | 25.6 |
| 8 | 60 | 40 | | 5 | 25.4 |
| 9 | 48 | 52 | | 5 | 25.4 |
| 10 | 22 | 78 | | 5 | 23.6 |
| 11 | 77 | 23 | 5 | 2 | 26.2 |
| 12 | 69 | 31 | 5 | 2 | 27.0 |
| 13 | 60 | 40 | 5 | 2 | 26.8 |
| 14 | 48 | 52 | 5 | 2 | 26.6 |
| 15 | 22 | 78 | 5 | 2 | 24.6 |
| Ref. Ex. | | | | | |
| 1 | 100 | 0 | 5 | | 21.5 |
| 2 | 100 | 0 | | 5 | 22.0 |
| 3 | 0 | 100 | 5 | | 20.4 |
| 4 | 0 | 100 | | 5 | 20.5 |
| 5 | 100 | 0 | | | 21.3 |
| 6 | 77 | 23 | | | 21.2 |
| 7 | 69 | 31 | | | 21.3 |
| 8 | 60 | 40 | | | 21.3 |
| 9 | 22 | 78 | | | 21.0 |
| 10 | 0 | 100 | | | 20.2 |
| 11 | Polychlorostyrene | | 5 | | 21.4 |
| 12 | 60 parts; polyacrylonitrile 40 parts. | | | 5 | 22.0 |
| 13 | | | 5 | 2 | 21.5 |

EXAMPLES 16, 17 and REFERENCE EXAMPLES 14–19.

To 100 parts of resin, which comprised 76 parts linear copolymer consisting of mixed chlorostyrene and acrlonitrile and 24 parts of graft copolymer produced by grafting on polybutadiene (average particle size 0.2 micron) with mixed chlorostyrene and acrylonitrile, each being prepared by emulsion-redox polymerization method, ferric oxide and stannic oxide were added. The mixture was rolled and pressed at 160° C to form test samples. The results of tests carried out on the samples are shown in Table 2. Reference Examples are also shown in Table 2. Such reference samples were carried out using the foregoing procedure with the variations therefrom as shown in Table 2.

TABLE 2

| Composition, fire resistance and properties (parts) | | Example 16 | Example 17 | Reference Example 14 | Reference Example 15 | Reference Example 16 | Reference Example 17 | Reference Example 18 | Reference Example 19 |
|---|---|---|---|---|---|---|---|---|---|
| Linear | Mixed chlorostyrene | 50 | 50 | 50 | 50 | 50 | 50 | 76 | 76 |
|  | Acrylonitrile | 26 | 26 | | | | | | |
| Copolymer | Styrene | | | 26 | 26 | | | | |
|  | Methyl Methacrylate | | | | | 26 | 26 | | |
| Graft | Polybutadiene | 12 | 12 | 12 | 12 | 12 | 12 | 12 | 12 |
|  | Mixed chlorostyrene | 8 | 8 | 8 | 8 | 8 | 8 | 8 | 8 |
| Copolymer | acrylonitrile | 4 | 4 | | | | | | |
|  | Styrene | | | 4 | 4 | | | | |
|  | Methyl methacrylate | | | | | 4 | 4 | | |
| Ferric Oxide (part) | | 5 | | 5 | | 5 | | 5 | |
| Stannic Oxide (part) | | | 5 | | 5 | | 5 | | 5 |
| LOI (%) | | 27.0 | 26.0 | 19.5 | 20.5 | 19.5 | 19.0 | 21.8 | 21.4 |
| OL-94 | | S.E.* 94V-1 | S.E.* 94V-1 | c.b.** | c.b.** | c.b.** | c.b.** | c.b.** | c.b.** |
| Impact Strength (kg.cm/cm²) | | 10.9 | 11.2 | 1.9 | 1.9 | 3.2 | 3.0 | 2.1 | 2.0 |
| Softening temperature (° C) | | 100 | 100 | 99 | 99 | 97 | 97 | 106 | 105 |

Note:
*S.E. = self-extinguishing
**c.b. = combustible

Both ferric oxide and stannic oxide have specific enhancing effects on the fire resistance of blends consisting of linear acrylonitrile-mixed chlorostyrene copolymer and polybutadiene-acrylonitrile-mixed chlorostyrene graft copolymer. High LOI values and corresponding 94V-1 rank by UL-94 test were obtained on the produced compositions.

The composition produced according to the inventive method in the examples have practical satisfactory impact strength and thermal stability as shown in Table 2. Resin compositions having styrene or methyl methacrylate in place of acrylonitrile, or resin compositions without acrylonitrile exhibited low LOI values and correspondingly combustible character by UL-94 test and have practically insufficient impact strength.

EXAMPLES 18, 19 and REFERENCE EXAMPLES 20, 21.

To 100 parts of a mixed resin powder which comprised linear vinyl copolymer of acrylonitrile, 30 parts, and mixed chlorostyrene, 70 parts, and graft copolymer prepared by grafting on 50 parts of polybutadiene (average particle size 0.2 micron) with 20 parts of acrylonitrile and 30 parts of mixed chlorostyrene, in a weight ratio of 8:2, a given amount of ferric oxide or stannic oxide was added. The resulting resin was rolled and pressed at 160° C to prepare test samples. The same procedure was repeated except to use antimony trioxide in place of ferrice oxide or stannic oxide to give the Reference Samples. The results of tests run on the samples are shown in Table 3. Ferric oxide and stannic oxide have substantially superior effect on fire resistance of the composition as compated to the known fire resistant agent antimony trioxide, as shown in Table 3.

EXAMPLES 21 to 27.

To 100 parts of the same resin powder as used in Examples 18 to 20, various types of iron family compound or tin compound were added and the mixed resin was rolled and pressed at 160° C to prepare test samples. Tests run on the sample produced results which are shown in Table 4.

TABLE 3

| Ex. No. | Resin (part) | Ferric Oxide (part) | Stannic oxide (part) | Antimony trioxide (part) | LOI (%) | UL-94 |
|---|---|---|---|---|---|---|
| 18 | 100 | 5 | 0 | 0 | 27.2 | S.E. (UL-94V-1) |
| 19 | 100 | 0 | 5 | 0 | 26.2 | S.E. (UL-94V-1) |
| 20 | 100 | 5 | 2 | 0 | 27.8 | S.E. (UL-94V-1) |
| Ref. Ex. 20 | 100 | 0 | 0 | 5 | 22.0 | combustible |
| 21 | 100 | 0 | 0 | 0 | 21.2 | combustible |

TABLE 4

| Ex. No. | Resin (part) | metallic compound Type | (part) | LOI (%) | UL-94 |
|---|---|---|---|---|---|
| 21 | 100 | Triferric tetraoxide | 5 | 27.4 | Self-extinguishing (94V-1) |
| 22 | 100 | Ferrocene | 5 | 27.5 | ″ |
| 23 | 100 | Cobaltous oxide | 5 | 25.3 | ″ |
| 24 | 100 | Nickel (III) oxide | 5 | 26.5 | ″ |
| 25 | 100 | Coblat stearate | 5 | 25.6 | ″ |

TABLE 4-continued

| Ex. No. | Resin (part) | metallic compound Type | (part) | LOI (%) | UL-94 |
|---|---|---|---|---|---|
| 26 | 100 | Stannous acetate | 10 | 26.5 | " |
| 27 | 100 | Metastannic acid | 10 | 26.2 | " |

All the test samples exhibited high LOI values and good self-extinguishing properties.

EXAMPLE 28.

To 250 parts of water, 10 parts of polybutadiene latex (based on solid content), 2 parts of sodium oleate, 0.3 part of sodium formaldehydesulfoxlate, 0.0025 part of ferrous sulfate·7hydrate and 0.01 part of bisodium salt of ethylene-diamine-tetra acetic acidbidhyrate were added. The resulting mixture was heated to 60° C. To the mixture a mixed solution consisting of 31.5 parts of acrylonitrile, 58.5 parts of mixed chlorostyrne, 0.4 part of cumenehydroperoxide and 0.3 part of tert-lauryl mercaptan was added continously in nitrogen atmosphere for a period of 5 hours. The product obtained was subjected to salting out, separating and drying to give polymer powder. Ninety-three parts of the polymer powder obtained, 5 parts of ferric oxide of fine grain form (average particle size 0.1 micron) and 2 parts of stannic oxide of fine grain (average particle size 0.2 micron) were mixed well in powder state. The mixture was extruded using an extruding machine at 210° C to form pellets. From the pellets test samples were molded with an injection molding machine and various properties of the samples were measured. The product was of 10 kg·cm/cm² impact strength; 100° C in softening temperature; and in fire resistivity UL(⅛ inch thickness) 94-V-O and UL(1/16 inch thickness) 94-V-O. From the above pellet there was molded an enclosure for use in a television set. The product was satisfactory for practical use.

The foregoing description illustrates the principles of this invention. Numerous other variations and modifications thereof would be apparent to the worker skilled in the art. All such variations and modifications are to be considered to be within the spirit and scope of the invention.

What is claimed is:
1. A fire resistant composition comprising
   A. 99.9 to 50 parts by weight of a copolymer consisting essentially of 90 to 10 weight percent nuclear halogenated aromatic vinyl compound, 10 to 90 weight percent cyanized vinyl compound and 0 to 30 weight percent one or more monomers copolymerizable therewith;
   B. 0 to 20 parts by weight of a rubber like polymer selected from the group consisting of polybutadiene, styrene-butadiene copolymer, acrylonitrile-butadiene copolymer and mixtures thereof; and
   C. 0.1 to 30 parts by weight of a member selected from the group consisting of iron compounds, cobalt compounds, nickel compounds, tin compounds, and mixtures thereof.
2. The composition of claim 1, wherein said rubber like polymer is in an amount of 5 to 15 parts by weight.
3. The composition of claim 1, wherein said nuclear halogenated aromatic vinyl compound is a member selected from the group consisting of mono-, di, or tri-halogenated styrene, monochlorovinyl toluene and monochlorovinyl naphthalene.
4. The composition of claim 1, wherein said cyanized vinyl compound is a member selected from the group consisting of acrylonitrile, ethacrylonitrile, and alpha chloroacrylonitrile.
5. The composition of claim 1, wherein said nuclear halogenated aromatic vinyl compound is monochlorostyrene and said cyanized vinyl compound is acrylonitrile.
6. The composition of claim 1, wherein said one or more copolymerizable monomers is methacrylic acid, maleic anhydride or alpha methyl styrene.
7. The composition of claim 1, wherein said metallic member is selected from the group consisting of iron oxide, methalocene of iron, nickel and cobalt.
8. The composition of claim 1, wherein said tin compound is selected from the group consisting of tin oxide, metastannic oxide, tin oxalate, tin sulfate, bis-triphenyl tin and mixture thereof.
9. The composition of claim 1, wherein said metallic member is a mixture of ferric oxide and stannic oxide.
10. The composition of claim 9, wherein the particle size of said ferric oxide and said stannic oxide is 0.2 microns or less.
11. The composition of claim 1, wherein said nuclear halogenated aromatic vinyl compound is in an amount of 80 to 50 weight percent; said cyanized vinyl compound is in an amount of 20 to 50 weight percent; and said metallic member is in an amount of 1 to 10 parts by weight.

* * * * *